United States Patent [19]
Takeuchi

[11] Patent Number: 5,806,008
[45] Date of Patent: Sep. 8, 1998

[54] SAFETY SYSTEM FOR VEHICLES

[75] Inventor: Kunihiro Takeuchi, Gumma-ken, Japan

[73] Assignee: Airbag Systems Company Ltd., Gumma-ken, Japan

[21] Appl. No.: 501,866

[22] Filed: Jul. 13, 1995

[30] Foreign Application Priority Data

Jul. 21, 1994 [JP] Japan ................................. 6-190889

[51] Int. Cl.⁶ .............................. G06F 7/70; B60R 21/32; B60L 3/00
[52] U.S. Cl. ................................ 701/45; 701/46; 701/36; 280/735; 280/734; 309/10.1; 340/438; 340/436
[58] Field of Search ..................... 364/424.055, 424.056, 364/424.058, 424.059, 423.098, 424.045; 307/10.1, 23, 66, 121; 340/436, 438, 479, 459, 463, 464; 280/735, 806, 734, 741, 736; 180/281, 282, 268, 274, 271; 701/36, 45, 46, 47

[56] References Cited

U.S. PATENT DOCUMENTS

| | | | |
|---|---|---|---|
| 5,081,587 | 1/1992 | Okano ............................... | 364/424.056 |
| 5,083,276 | 1/1992 | Okano et al. ..................... | 364/424.056 |
| 5,085,464 | 2/1992 | Behr et al. ........................ | 280/735 |
| 5,155,376 | 10/1992 | Okano ................................ | 307/10.1 |
| 5,158,323 | 10/1992 | Yamamoto ........................ | 280/734 |
| 5,262,949 | 11/1993 | Okano et al. ..................... | 364/424.056 |
| 5,283,472 | 2/1994 | Takeuchi et al. ................. | 307/10.1 |
| 5,326,146 | 7/1994 | Takeuchi .......................... | 280/735 |
| 5,338,063 | 8/1994 | Takeuchi et al. ................. | 280/735 |
| 5,343,394 | 8/1994 | Takeuchi et al. ................. | 364/424.055 |
| 5,373,193 | 12/1994 | Nilsson et al. ................... | 307/10.1 |
| 5,409,258 | 4/1995 | Kawabata ......................... | 364/424.055 |
| 5,424,584 | 6/1995 | Matsuda et al. .................. | 307/10.1 |
| 5,506,775 | 4/1996 | Tsurushima et al. ............. | 364/424.055 |
| 5,596,497 | 1/1997 | Honda ............................... | 364/424.055 |

FOREIGN PATENT DOCUMENTS 41 29 314 A1  3/1992  Germany ................. B60R 21/24
3-57 748 A2  7/1989  Japan .

Primary Examiner—Jacques H. Louis-Jacques
Attorney, Agent, or Firm—Fish & Richardson P.C.

[57] ABSTRACT

Activators for a plurality of safety devices are connected in parallel relation to each other and connected to a common power source. Switching elements are connected in series to the activators respectively. A common safety switch is connected in serial relation to the activators and connected to the power source. This safety switch is turned on by a lower level of shock than that which is judged as a vehicle collision by a micro computer. The micro computer judges whether or not the vehicle has collided based on an acceleration information from an acceleration sensor. The micro computer controls the switching elements such that the switching elements are cyclically and alternately turned on at the moment a vehicle-collision judgment is made.

6 Claims, 2 Drawing Sheets

SAFETY SYSTEM FOR VEHICLES

BACKGROUND OF THE INVENTION

This invention relates to a safety system for vehicles having a plurality of safety devices such as air-bags and the like.

A safety system for vehicles having two air-bags (safety devices), one at a driver's seat and the other at an assistant driver's seat, is known. In order to activate the two air-bags at the moment a vehicle collision occurs, this safety system has the following construction.

Squibs (actuators) of the two air-bags are connected in parallel relation to each other and in serial relation to a common safety switch. Transistors (switching means) are connected to the squibs in series, respectively. The micro computer (control means) turns on the transistors simultaneously when it makes a judgment that a vehicle collision has occurred, based on acceleration detected by an acceleration sensor. The safety switch is adapted to prevent the air-bags from being inflated when the micro computer is subjected to a runaway. The safety switch is turned on by a lower level of shock than that which is judged as a vehicle collision by the micro computer. Thus, when the transistors are turned on, an electric current from a common power source is supplied to the two squibs simultaneously and the two air-bags are inflated simultaneously.

However, when an electric current is supplied simultaneously to the two parallel squibs, an electric current exceeding an allowable limit is supplied to the safety switch because a combined resistance of the squibs is low. As a consequence, there is a possibility that contacts of the safety switch are fused. This prevents a possible re-use of the safety system.

In safety systems disclosed in Japanese Laid-Open Patent Application No. Hei 3-57748 and U.S. Pat. No. 5,155,376, a transistor connected in series to a squib of an air-bag on a driver's seat side is turned on first and then a transistor connected in series to a squib of an air-bag on an assistant driver's seat side is turned on with a delay of a predetermined time. Owing to this arrangement, the air-bag on the assistant driver's seat side is inflated later than the air-bag on the driver's seat side. This type of a safety system has the same problem as mentioned above because if the delay is set to be short, there exists a period during which the two transistors are in the ON-states simultaneously. Any attempt for separating the ON-state time of the two transistors for the purposes of avoiding the transistors from being turned on simultaneously is encountered with a difficulty in that the delay cannot be freely set because it is required for the transistor corresponding to the air-bag on the driver's seat side to be kept in the ON-state long enough for inflating the air-bag on the driver's seat side and thereafter, the transistor corresponding to the assistant driver's seat side is turned on.

SUMMARY OF THE INVENTION

It is, therefore, an object of the present invention to provide a safety system, in which a plurality of safety devices can be activated without supplying an electric current exceeding an allowable limit to a common safety switch and yet the timing for activating the safety devices can be freely set.

According to the present invention, there is provided a safety system for vehicles for actuating a plurality of safety devices, the system comprising:

(a) a plurality of activators for the safety devices connected in parallel relation to each other and connected to a common power source;

(b) a plurality of switching means connected in series to the activators, respectively;

(c) a common safety switch connected in serial relation to the activators and connected to the power source, the common safety switch being turned on by a shock of a comparatively low level;

(d) an acceleration sensor for detecting an acceleration acting on a vehicle; and (e) control means for judging whether or not the vehicle has collided based on an acceleration signal from the acceleration sensor, the control means controlling the switching means so as to be cyclically and alternately turned on when a vehicle-collision judgment is made.

DETAILED DESCRIPTION OF THE EMBODIMENTS

One embodiment of the present invention will now be described with reference to FIGS. 1 to 3.

Figure 1:
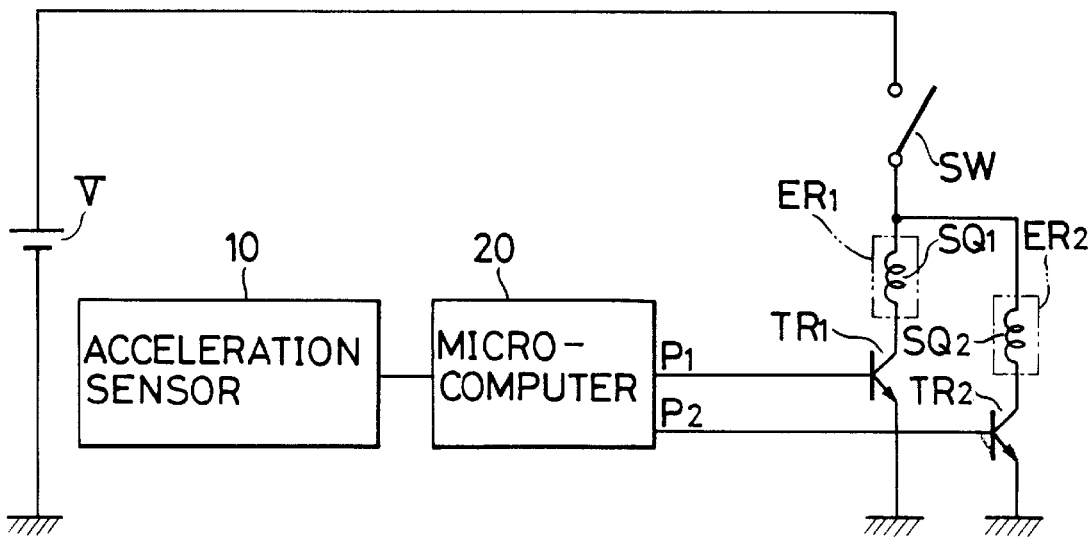
FIG. 1 is a circuit diagram showing one embodiment of a safety system for vehicles according to the present invention.
Figure 2:
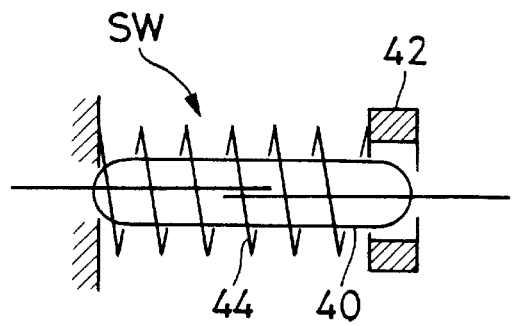
FIG. 2 is a schematic view showing a construction of a safety switch to be used in the above embodiment.

FIG. 1 schematically shows a construction of a safety system for vehicles, capable of controlling two air-bags $ER_1$, $ER_2$, one for a driver's seat and the other for an assistant driver's seat. Squibs $SQ_1$, $SQ_2$ for the air-bags $ER_1$, $ER_2$ are connected in parallel relation to each other and in serial relation to a common safety switch SW. The safety switch SW is connected to a common power source V. Transistors $TR_1$, $TR_2$ of the NPT type (switching means) are connected in series to the squibs $SQ_1$, $SQ_2$, respectively.

The safety system further comprises an acceleration sensor 10 for detecting an acceleration acting on a vehicle, and a micro computer 20. The micro computer 20 has two output ports $P_1$, $P_2$. The ports $P_1$, $P_2$ are connected to bases of the transistors $TR_1$, $TR_2$, respectively.

The safety switch SW is turned on by a lower level of shock than that which is judged as a vehicle collision by the micro computer 20 as later described. As shown in FIG. 2, for example, this safety switch SW is of a construction in which a magnet 42 is movably provided on an outer periphery of a lead switch 40 and biased by a spring 44. By a shock caused by a vehicle collision, the magnet 42 is moved against the spring 44 to turn on the lead switch 40.

The micro computer 20 makes a judgment every predetermined cycle as to whether or not a vehicle has collided, based on an acceleration detected by the acceleration detector 10. That is, the micro computer 20 integrates the acceleration (minus acceleration) every predetermined cycle and judges whether or not an integrated value thus obtained has exceeded a threshold level. If exceeded, the micro computer judges that a vehicle collision has occurred. When a judgment is made that a vehicle collision has occurred, the micro computer 20 controls the transistors $TR_1$, $TR_2$ through the output ports $P_1$, $P_2$. That is, when the output port $P_1$ outputs a high level signal, the transistor $TR_1$ is turned on to allow an electric current to be supplied to the squib $Q_1$. Similarly, when the output port $P_2$ outputs a high level signal, the transistor $TR_2$ is turned on to supply an electric current to the squib $SQ_2$. By doing this, the micro computer 20 controls the supply of electric current to the squibs $SQ_1$, $SQ_2$.

The above-mentioned construction and operation are basically the same as the known safety system. In the safety system of this embodiment, the way of controlling of the transistors $TR_1$, $TR_2$ by the micro computer 20 is different from that of the prior art. This will be described in detail.

Figure 3:
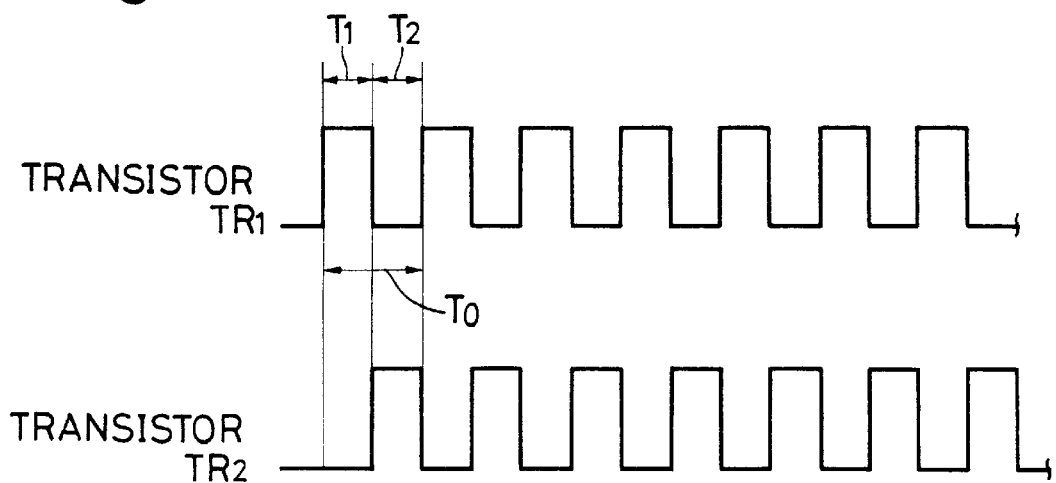
FIG. 3 is a time chart for controlling transistors in the above embodiment.

As shown in FIG. 3, when the above-mentioned vehicle-collision judgment is made, the micro computer 20 controls such that outputs from the output ports $P_1$, $P_2$ are alternately and cyclically brought to a high level at a cycle of, for example, $50\mu$ sec. For example, in the first half cycle $T_1$ of a full cycle $T_0$, the output port $P_1$ is at a high level (transistor $TR_1$, is in the ON-state) and the other output port $P_2$ is at a low level (transistor $TR_2$ is in the OFF-state), whereas in the last half cycle $T_2$ ($T_1=T_2$), the output port $P_1$ is at a low level (transistor $TR_1$ is in the OFF-state) and the other output port $P_2$ is at a high level (transistor $TR_2$ is in the ON-state). Since the safety switch SW is already in the ON-state at that time, an electric current is alternately supplied to the squibs $SQ_1$, $SQ_2$ by turning on the transistors $TR_1$, $TR_2$ alternately. As a consequence, the air-bag $ER_1$ at the driver's seat and the air-bag $ER_2$ at the assistant driver's seat are almost simultaneously inflated by supplying an electric current for about 2 m sec., for example.

As mentioned above, since an electric current is supplied to the squibs $SQ_1$, $SQ_2$ alternately instead of simultaneously, an electric current supplied to the safety switch SW becomes about a half when compared with a case where an electric current is supplied to the squibs $SQ_1$, $SQ_2$ simultaneously. For this reason, it becomes possible to prevent an electric current exceeding an allowable limit from being supplied to the safety switch SW. Consequently, the contacts of the safety switch SW can be prevented from being fused. Thus, the safety system can be re-used even after the safety system for vehicles is once activated.

Figure 4:
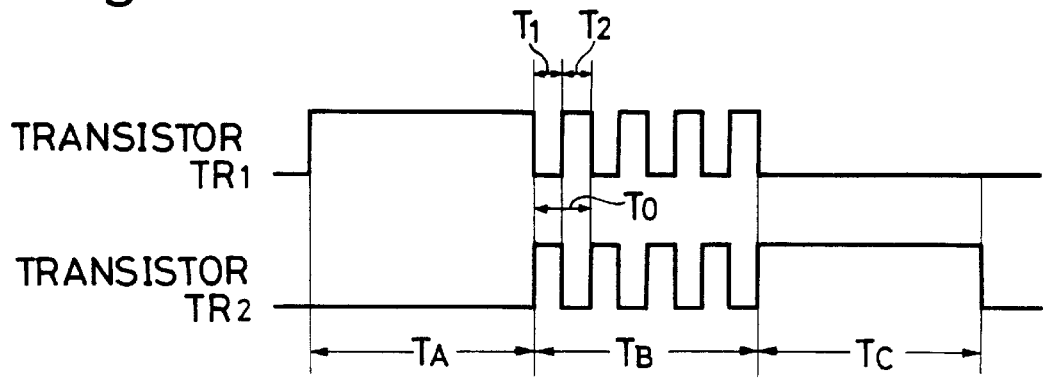
FIG. 4 is a time chart showing another mode of controlling transistors.

Next, other modes for controlling the transistors $TR_1$, $TR_2$ by the micro computer 20 will be described. In a control mode shown in FIG. 4, when a judgment is made that a vehicle collision has occurred, the micro computer 20 turns on only the transistor $TR_1$, and maintains the other transistor $TR_2$ in the OFF-state in the first period $T_A$. The micro computer 20 turns on the transistors $TR_1$, $TR_2$ alternately and cyclically, as in the case with FIG. 3, in the second period $T_B$. The ON-state time $T_1$ of the transistor $TR_1$ and the ON-state time $T_2$ of the other transistor $TR_2$ in a full cycle $T_0$ are equal to each other. The micro computer 20 turns on only the transistor $TR_2$ and maintains the other transistor $TR_1$ in the OFF-state in the third period $T_c$. In the middle of the second period $T_B$, the time of supplying an electric current to the squib $SQ_1$ reaches a critical level and the air-bag $ER_1$, on the driver's seat side is inflated. In the middle of the third period $T_c$, the time of supplying an electric current to the squib $SQ_1$ reaches a critical level and the air-bag $ER_2$ on the assistant driver's seat side is inflated. In this way, the air-bag $ER_2$ on the assistant driver's seat side is inflated slightly later than the air-bag $ER_1$ on the driver's seat side. This delay of time can be freely set by adjusting the first period $T_A$.

Figure 5:
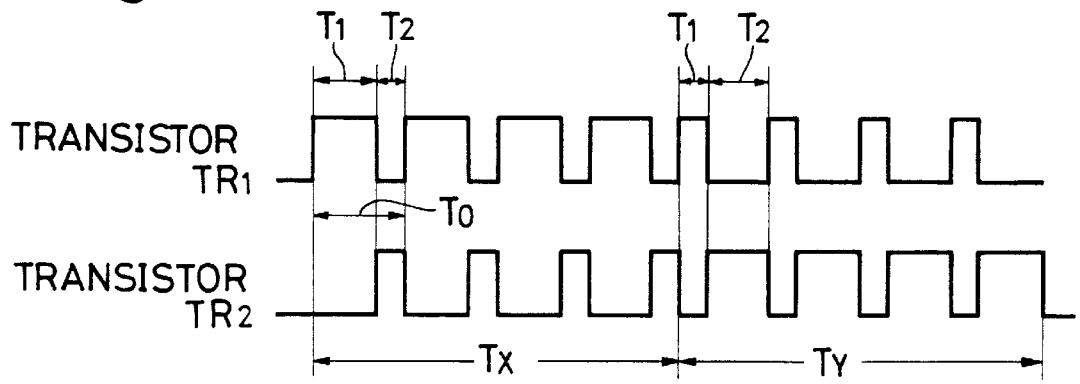
FIG. 5 is a time chart showing a further mode of controlling transistors.

In a control mode shown in FIG. 5, the entire control period is divided into a first period $T_X$ and a second period $T_Y$ and when the micro computer 20 judges that a vehicle collision has occurred, both the transistors $TR_1$, $TR_2$ are controlled first in the first period $T_X$ and then in the second period $T_Y$. In the first period $T_X$, the ON-state time $T_1$ of the transistor $TR_1$ is such controlled as to be longer than the ON-state time $T_2$ of the transistor $TR_2$, and the transistors $TR_1$, $TR_2$ are alternately and cyclically turned on. In the second period $T_Y$, the ON-state time $T_2$ of the transistor $TR_2$ is such controlled as to be longer than the ON-state time $T_1$ of the transistor $TR_1$, and the transistors $TR_1$, $TR_2$ are alternately and cyclically turned on. After the start of the second period $T_Y$, the time of supplying an electric current to the squib $SQ_1$ reaches a critical level and the air-bag $ER_1$ on the driver's seat side is inflated. Thereafter, the time of supplying an electric current to the squib $SQ_2$ reaches a critical level and the air-bag $ER_2$ on the assistant driver's seat side is inflated. In this way, the air-bag $ER_2$ on the assistant driver's seat side is inflated slightly later than the air-bag $ER_1$ on the driver's seat side. This delay of time can be freely set by adjusting the ratio of the ON-state time $T_1$ of the transistor $TR_1$ to the ON-state time $T_2$ of the transistor $TR_2$ in one or both of the first and second periods $T_X$ and $T_Y$.

Figure 6:
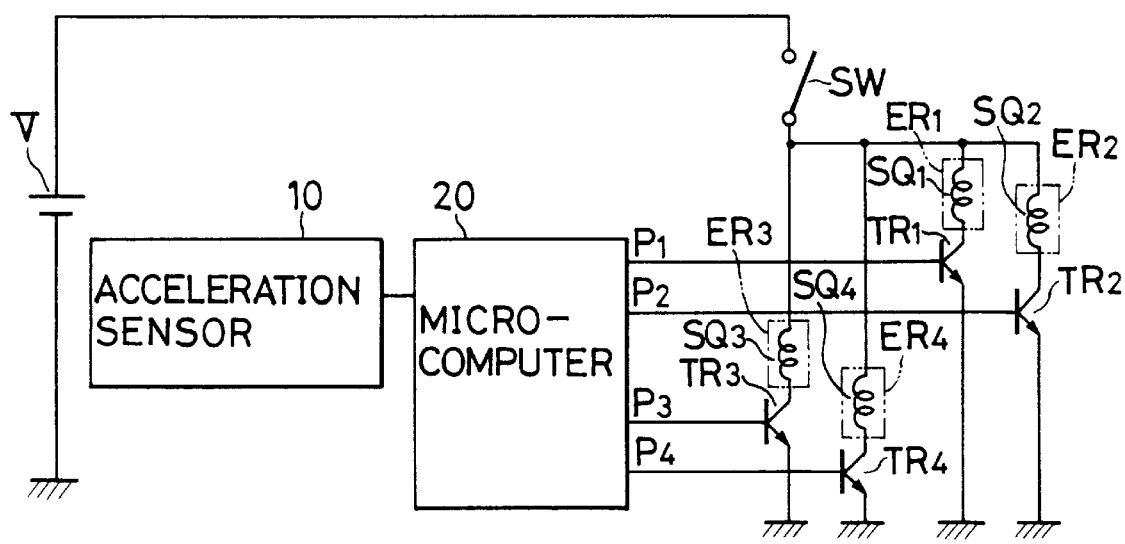
FIG. 6 is a circuit diagram showing another embodiment of the present invention.

A safety system shown in FIG. 6 comprises the same component parts as the safety system of FIG. 1. In the illustration, like component parts are denoted by like reference numerals and description thereof is omitted. The safety system of FIG. 6 controls additional air-bags $ER_3$, $ER_4$ at a rear seat. Squibs $SQ_3$, $SQ_4$ of the air-bags $ER_3$, $ER_4$ are in parallel relation to the squibs $SQ_1$, $SQ_2$. Transistors $TR_3$, $TR_4$ are connected to the squibs $SQ_3$, $SQ_4$ in series, respectively. Output ports $P_3$, $P_4$ of the micro computer 20 are connected to bases of the transistors $TR_3$, $TR_4$, respectively. The transistor $TR_3$ is on/off controlled in synchronism with the transistor $TR_1$, whereas the transistor $TR_4$ is on/off controlled in synchronism with the transistor $TR_2$. In this embodiment, the control mode shown in FIG. 3 is preferable. By this, the air-bags $ER_1$, $ER_2$, $ER_3$ and $ER_4$ can be all inflated almost simultaneously. Moreover, the electric current supplied to the safety switch SW can be reduced to a half compared with the case where an electric current is supplied simultaneously to the squibs $SQ_1$, $SQ_2$, $SQ_3$ and $SQ_4$ which are arranged in parallel, and the contacts of the safety switch SW can be prevented from being fused.

It should be noted that the present invention is not limited to the above embodiments and various modifications can be made. For example, a period for both of the transistors to be in the OFF-states may exist in a full cycle mentioned above.

Also, it is possible to arrange such that three or more activators and a corresponding number of transistors are employed and a full cycle is divided into three or more sections so that the transistors can be turned on, one in each section, to supply an electric current to the corresponding activators.

In the above-mentioned embodiments, the present invention is applied to an air-bag device. However, the present invention is likewise applicable to such safety devices as seat belt catchers, etc.

What is claimed is:

1. A safety system for vehicles for actuating a plurality of safety devices including first and second safety devices, said system comprising:

(a) first and second activators for said first and second safety devices connected in parallel relation to each other and connected to a common power source;

(b) first and second switching elements connected in series to said first and second activators, respectively;

(c) an acceleration sensor for detecting an acceleration acting on a vehicle; and (d) a control device for judging whether or not the vehicle has collided based on an acceleration signal from said acceleration sensor, said control device controlling said first and second switching elements in regular, periodic cycles when a vehicle-collision judgment is made;

(e) wherein each said regular, periodic cycle includes a first and second time period, wherein during said first time period said first switching element is turned on to supply electric current to said first activator and said second switching element is turned off, and during said second time period said first switching element is turned off and said second switching element is turned on to supply electric current to said second activator; and (f) wherein said control device controls said first and second switching elements in a first and second stage in response to the collision judgement such that during said first stage said first time period of each said regular, periodic cycle is longer than said second time period, and during said second stage said second time period of each said regular, periodic cycle is longer than said first time period to activate said first safety device and, after a time delay, activate said second safety device.

2. A system according to claim 1, in which a common safety switch is connected in serial relation to said activators and connected to said power source, said common safety switch being turned on by a shock of a comparatively low level.

3. A system according to claim 1, in which said first safety device is disposed on a driver's seat side and said second safety device is disposed on a passenger's seat side.

4. A system according to claim 3, further comprising:

third and fourth safety devices disposed at a rear seat;

third and fourth activators for said third and fourth safety devices, said third and fourth activators connected in parallel relation to said first and second activators; and third and fourth switching elements connected in series to said third and fourth activators, respectively, wherein said third and fourth switching elements are controlled in synchronism with said first and second switching elements, respectively.

5. A safety system for vehicles for actuating a plurality of safety devices including first and second safety devices, said system comprising:

(a) first and second activators for said first and second safety devices connected in parallel relation to each other and connected to a common power source;

(b) first and second switching elements connected in series to said first and second activators, respectively;

(c) an acceleration sensor for detecting an acceleration acting on a vehicle; and (d) a control device for judging whether or not the vehicle has collided based on an acceleration signal from said acceleration sensor, said control device controlling said first and second switching elements in regular, periodic cycles when a vehicle-collision judgment is made;

(e) wherein each said regular, periodic cycle includes a first and second time period, wherein during said first time period said first switching element is turned on to supply electric current to said first activator and said second switching element is turned off, and during said second time period said first switching element is turned off and said second switching element is turned on to supply electric current to said second activator;

(f) wherein said first safety device is disposed on a driver's seat side and said second safety device is disposed on a passenger's seat side; and (g) wherein said control device controls said first and second switching elements in a first, second, and third stage in response to the collision judgement such that during said first stage only said first switching element is turned on, during said second stage said first switching element and said second switching element are alternately turned on and off in said regular, periodic cycles to activate said first safety device, and during said third stage only said second switching element is turned on to activate said second safety device.

6. A system according to claim 5, in which each time period of said first and second time periods is equal to a half of said cycle.

* * * * *